(12) United States Patent
Mazzara, Jr.

(10) Patent No.: US 8,055,308 B2
(45) Date of Patent: Nov. 8, 2011

(54) METHOD AND SYSTEM FOR RESPONDING TO DIGITAL VEHICLE REQUESTS

(75) Inventor: William E. Mazzara, Jr., Drayton Plains, MI (US)

(73) Assignee: General Motors LLC, Detroit, MI (US)

( * ) Notice: Subject to any disclaimer, the term of this patent is extended or adjusted under 35 U.S.C. 154(b) by 857 days.

(21) Appl. No.: 10/675,349

(22) Filed: Sep. 30, 2003

(65) Prior Publication Data

US 2005/0070260 A1   Mar. 31, 2005

(51) Int. Cl.
 *H04M 1/00* (2006.01)
(52) U.S. Cl. .............. 455/569.2; 455/563; 455/570; 705/14.62; 705/14.63
(58) Field of Classification Search ............. 455/423, 455/414.2, 563, 456.1; 701/29, 36
See application file for complete search history.

(56) References Cited

U.S. PATENT DOCUMENTS

| | | | |
|---|---|---|---|
| 4,182,989 A * | 1/1980 | Endo et al. ............. | 455/524 |
| 5,854,978 A * | 12/1998 | Heidari ............. | 455/418 |
| 6,236,855 B1 * | 5/2001 | Austin ............. | 455/423 |
| 6,487,500 B2 * | 11/2002 | Lemelson et al. ........ | 701/301 |
| 6,611,739 B1 * | 8/2003 | Harvey et al. ......... | 701/29 |
| 6,697,730 B2 | 2/2004 | Dickerson | |
| 6,741,921 B2 * | 5/2004 | Cohen et al. ........ | 701/50 |
| 6,748,211 B1 * | 6/2004 | Isaac et al. ............ | 455/414.1 |
| 6,904,270 B1 * | 6/2005 | Chan ............. | 455/156.1 |
| 7,308,508 B1 * | 12/2007 | Dewa ............. | 709/247 |
| 7,668,968 B1 * | 2/2010 | Smith ............. | 709/234 |
| 2001/0029425 A1 * | 10/2001 | Myr ............. | 701/200 |
| 2001/0044315 A1 * | 11/2001 | Aoki et al. ............ | 455/524 |
| 2002/0049535 A1 * | 4/2002 | Rigo et al. ............ | 701/211 |
| 2002/0115436 A1 * | 8/2002 | Howell et al. ............ | 455/426 |
| 2002/0141547 A1 * | 10/2002 | Odinak et al. ............ | 379/88.01 |
| 2002/0143645 A1 * | 10/2002 | Odinak et al. ............ | 705/26 |
| 2003/0216145 A1 * | 11/2003 | Cox et al. ............ | 455/456.1 |
| 2005/0003812 A1 * | 1/2005 | Gladwin et al. ......... | 455/426.1 |
| 2005/0065779 A1 * | 3/2005 | Odinak ............. | 704/201 |

OTHER PUBLICATIONS

U.S. Appl. No. 10/650,549, filed Aug. 28, 2003, Osterling Chris L.

* cited by examiner

*Primary Examiner* — Dai A Phuong
(74) *Attorney, Agent, or Firm* — Anthony L. Simon; Reising Ethington P.C.

(57) ABSTRACT

The invention provides a method and system for responding to digital vehicle requests. After a telematics unit receives a voice query and converts the voice query to a compressed digital signal, the signal is transmitted to a call center node. The signal is then parsed at the call center node to determine an inquiry. The call center node may then formulate at least one response to the inquiry and transmit the at least one formulated response in a digital format over the wireless network to the telematics unit. The at least one formulated response is then translated to an analog format at the telematics unit.

12 Claims, 2 Drawing Sheets

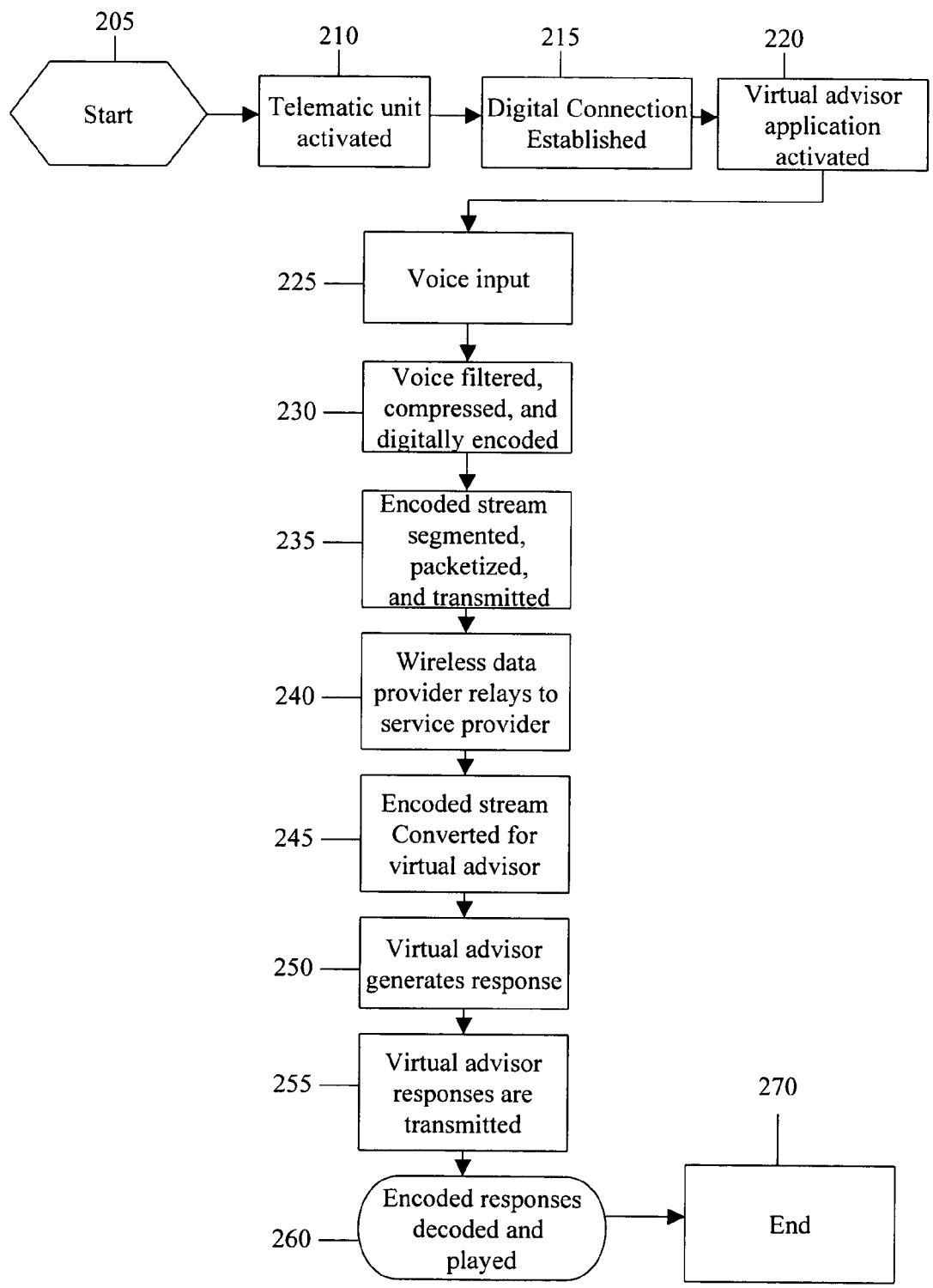

METHOD AND SYSTEM FOR RESPONDING TO DIGITAL VEHICLE REQUESTS

FIELD OF THE INVENTION

This invention relates generally to digital cellular connections between a vehicle and a remote node. In particular, this invention relates to a method and system for responding to digital vehicle requests.

BACKGROUND OF THE INVENTION

Communication devices that communicate between a vehicle, an interactive application, and an advisor on a remote node presently accomplish this through a circuit switched voice connection. Upon a user's request from a vehicle, an analog voice input is encoded into a digital signal intended for a human recipient. This signal cannot be maximally compressed due to the need for a human advisor to understand the request—maximally compressed signals may not be comprehensible to humans. The encoded digital signal must then be converted into an analog signal once it reaches the analog voice connection channel. The analog signal is then once again converted to a digital signal when it passes to the computer system of the remote node from the voice connection channel. The signal then must again be converted into an analog format for the human recipient. The same process of conversion must then be done in reverse in order to send a response from the remote node to the vehicle's user.

The multiple conversions from digital to analog format and vice versa are costly and time consuming. In addition, having a person as an end recipient does not allow maximum compression of the vehicle's user request. Moreover, Voice over IP technology is beginning to be implemented into vehicles to replace analog communications.

Accordingly, it would be desirable to have a method and system for responding to digital vehicle requests that overcomes the above disadvantages.

SUMMARY OF THE INVENTION

One aspect of the present invention provides a method for responding to digital vehicle requests. The method includes receiving a voice query by a telematics unit, wherein the telematics unit comprises at least one analog digital converter. The method also includes converting the voice query to a compressed digital signal and transmitting the signal to a call center node in communication with an information database via a wireless network. The method also includes parsing the signal at the call center node to determine an inquiry and accessing the information database based on the inquiry. The method also includes formulating at least one response to the inquiry and transmitting the at least one formulated response in a digital format over the wireless network to the telematics unit. The method further includes translating the at least one formulated response to an analog format at the at least one analog digital converter.

Another aspect of the present invention provides a computer usable medium including a computer readable program for responding to digital vehicle requests. The program includes computer readable program code that receives a voice query by a telematics unit, wherein the telematics unit comprises computer readable program code for at least one analog digital converter. The program also includes computer readable program code for converting the voice query to a compressed digital signal and computer readable program code for transmitting the signal to a call center node in communication with an information database via a wireless network. The program also includes computer readable program code for parsing the signal at the call center node to determine an inquiry and computer readable program code for accessing the information database based on the inquiry. The program also includes computer readable program code for formulating at least one response to the inquiry and computer readable program code for transmitting the at least one formulated response in a digital format over the wireless network to the telematics unit. The program further includes computer readable program code for translating the formulated responses to an analog format at the at least one analog digital converter.

Another aspect of the present invention provides a system for responding to digital vehicle requests. The system includes means for receiving a voice query by a telematics unit, wherein the telematics unit comprises means for at least one digital converter. The system also includes means for converting the voice query to a compressed digital signal and means for transmitting the signal to a call center node in communication with an information database via a wireless network. The system also includes means for parsing the signal at the call center node to determine an inquiry and means for accessing the information database based on the inquiry. The system also includes means for formulating at least one response to the inquiry and means for transmitting the at least one formulated response in a digital format over the wireless network to the telematics unit. The system further includes means for translating the formulated responses to an analog format at the at least one analog digital converter.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of one embodiment of a method and system for responding to digital vehicle requests, in accordance with the current invention.

DETAILED DESCRIPTION OF THE PRESENTLY PREFERRED EMBODIMENTS

Figure 1:
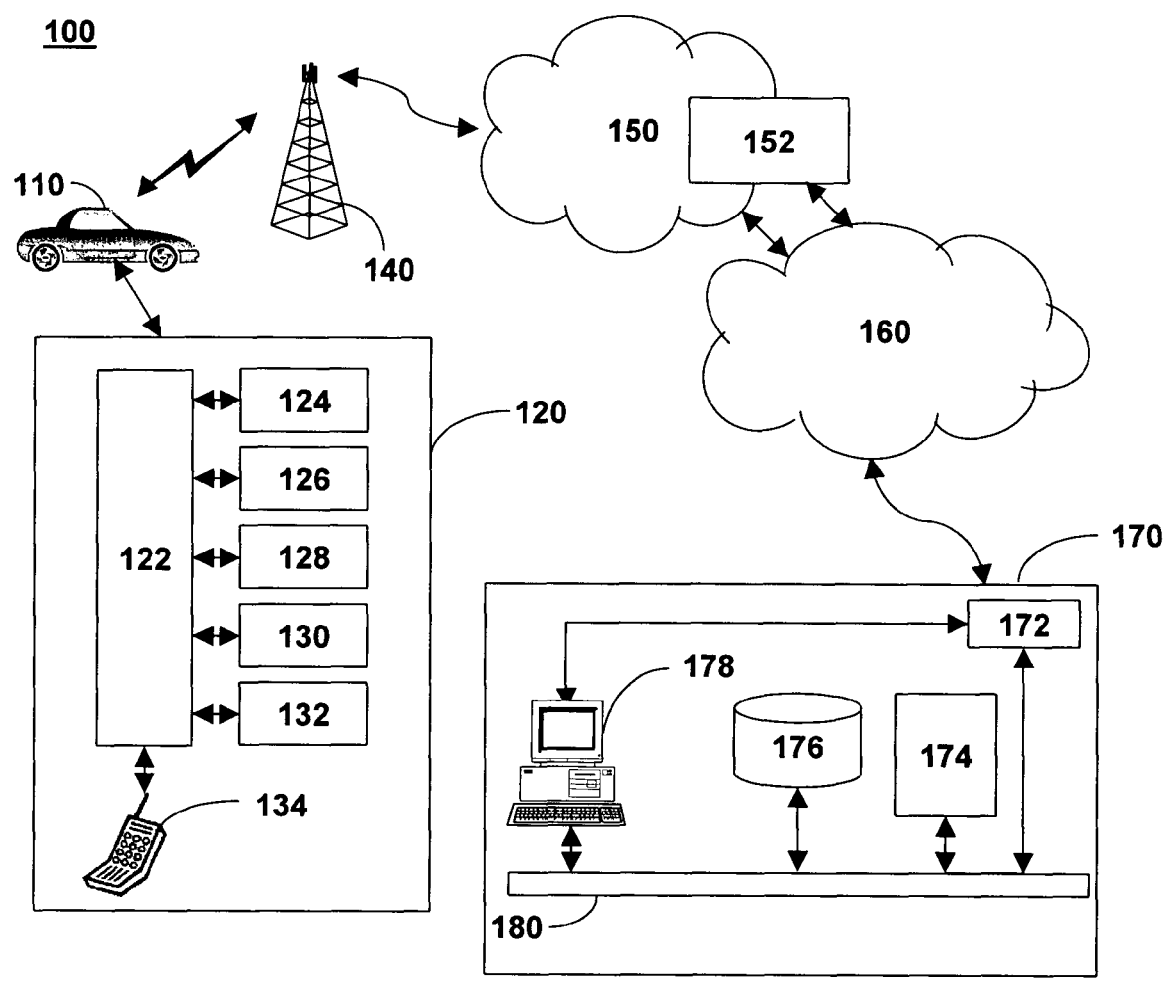
FIG. 1 is a block diagram illustrating an operating environment in accordance with one embodiment of the present invention.

FIG. 1 shows an illustration of one embodiment of a method and system for responding to digital vehicle requests, in accordance with the present invention at 100.

FIG. 1 details an embodiment of a system for operating a wireless communication service in a mobile vehicle, and may be referred to as a mobile vehicle communication system (MVCS) 100. The system 100 includes, in one embodiment, a mobile vehicle 110, a telematics unit 120, one or more wireless carrier systems 140, one or more communication networks 150, one or more land networks 160, and one or more call centers 170. In an example, MVCS 100 is implemented as an OnStar® system available from OnStar® Corp., a subsidiary of General Motors Corp. of Troy, Mich., as is known in the art.

Mobile vehicle 110 is a mobile vehicle equipped with suitable hardware and software for transmitting and receiving voice and data communications. Mobile vehicle 110 may be implemented as a motor vehicle, a marine vehicle, or as an aircraft. Mobile vehicle 110 contains telematics unit 120 that includes a vehicle communications processor. Telematics unit 120 includes digital signal processor (DSP) 122 connected to a wireless analog, digital or dual-mode modem 124, a global positioning system (GPS) unit 126, an in-vehicle memory 128, a microphone 130, one or more speakers 132, and a network access device (NAD) or in-vehicle mobile phone 134. The DSP 122 may convert an analog input to a digital output. The DSP 122 may also convert a digital input to an analog output. In one embodiment, the DSP 122 contains a separate converter for analog-to-digital and a separate converter for digital-to-analog functions. In another embodiment the DSP 122 contains a reversible analog-to-digital converter that can perform both analog-to-digital, and digital-to-analog, functions. In-vehicle mobile phone 134 may be an analog, digital, or dual-mode cellular phone. GPS unit 126 may provide, for example, longitude and latitude coordinates of the vehicle.

DSP 122 may contain various computer programs that control programming and operational modes of various applications within mobile vehicle 110. A voice-recognition application may be installed in DSP 122 that may translate human voice input through microphone 130 to digital signals. These signals may activate the programming mode and operation modes, as well as provide input data. Output signals from DSP 122 may be transformed into digitized voice messages that may be sent out through speaker 132. In other embodiments, DSP 122 is a functional component of a microcontroller, microprocessor or ASIC.

Mobile vehicle 110 via telematics unit 120 may send and receive radio transmissions from wireless carrier system 140. Wireless carrier system 140 may be any suitable system for transmitting a signal from mobile vehicle 110 to communication network 150. Wireless communication system 140 incorporates any type of telecommunications in which electromagnetic waves carry signal over part of or the entire communication path.

In one embodiment of the invention the wireless carrier system 140 may be a wireless carrier system such as a personal communications system (PCS), a global system for mobile communication (GSM), or the like. Wireless carrier system 140 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Examples of such digital mobile telephone systems include code division multiple access (CDMA) (e.g. IS-95), Groupe Special Mobile (GSM), frequency division multiple access (FDMA), and time division multiple access (TDMA).

In another embodiment the wireless carrier system 140 includes IEEE's 802.11 standard or Bluetooth®), and the like.

In another embodiment of the invention, the carrier system may be a link to one or more satellites that is in communication with one or more base satellite dish receivers (not shown).

Communication network 150 may comprise services from one or more mobile telephone switching offices and wireless networks. Communication network 150 may connect wireless carrier system 140 to land network 160. Communication network 150 may be any suitable system or collection of systems for connecting wireless carrier system 140 to mobile vehicle 110 and land network 160.

Communication network 150 may include one or more short message service centers (SMSC) 152, which may send and receive short messages according to established protocols such as IS-637 standards for short message service (SMS), IS-136 air interface standards for SMS, and GSM 03.40 and 09.02 standards. SMS-based services may use a variety of protocols such as those approve by the European Telecommunication Standards Institute (ETSI): SMPP, CIMD, UCP/EMI, and SMS0. Similar to paging, an SMS communication may be posted along with an intended recipient, such as a communication device in mobile vehicle 110. SMSC 152 may be software that resides in communication network 150 and manages the processes including queuing the messages, billing the sender, and returning receipts if necessary.

Land network 160 may be a public-switched telephone network (PSTN). Land network 160 may be an Internet protocol (IP) network. Land network 160 may be comprised of a wired network, an optical network, a fiber network, another wireless network, or any combination thereof. Land network 160 may be connected to one or more land-line telephones. Land network 160 may connect communication network 150 to call center 170. Communication network 150 and land network 160 may connect wireless carrier system 140 to a communication node or call center 170.

Call center 170 may be a telematics service center. Call center 170 may contain one or more voice and data switches 172, one or more communication services managers 174, one or more communication services databases 176, one or more communication services advisors 178, and one or more networks 180.

Call center 170 may be a location where many calls may be received and serviced at the same time, or where many calls may be sent at the same time. The call center may be a telematics call center, prescribing communications to and from telematics unit 120 in mobile vehicle 110. The call center may be a voice call center, providing verbal communications between an advisor in the call center and a subscriber in a mobile vehicle. The call center may be a short message service (SMS) management center, which may send SMS communications to mobile vehicle 110 and receive SMS communications back from mobile vehicle 110 via SMSC 152 of communication network 150. The call center may contain each of these functions.

The call center 170 can be implemented in any number of configurations, such as, a voice and/or data call center providing verbal and/or data communications between an advisor and/or advisor data applications in the call center and a subscriber within or outside of a mobile vehicle, a voice activated call center providing verbal communications between an Automatic Speech Recognition (ASR) unit and a subscriber in a mobile vehicle, or as an Internet service providing communications between a subscriber using a client application with a user interface and backend services. In an example, the call center is implemented to service an OnStar® system including one or more of the above examples, such as, an OnStar® Virtual Advisor service providing a voice activated call center to service an OnStar® system.

Call center 170 may contain one or more voice and data switches 172. Switch 172 may be connected to land network 160. Switch 172 may transmit voice or data transmissions from call center 170. Switch 172 also may receive voice or data transmissions from telematics unit 120 in mobile vehicle 110 through wireless carrier system 140, communication network 150 and land network 160. Switch 172 may receive from or send to one or more communication services managers 174 data transmissions via one or networks 180. Communication services manager 174 may be any suitable hardware and software capable of providing requested communication services to telematics unit 120 in mobile vehicle 110. Communication services manager 174 may send to or receive from one or more communication services databases 176 data transmissions via networks 180. Communication services manager 174 may send to or receive from one or more communication services advisors 178 data transmissions via networks 180. Communication services database 176 may send to or receive from communication services advisor 178 data transmissions via networks 180. Communication services advisor 178 may receive from or send to switch 172 voice or data transmissions.

Communication services manager 174 may provide one or more of a variety of services, including enrollment services, navigation assistance, directory assistance, roadside assistance, business or residential assistance, information services assistance, emergency assistance, communications assistance and activation services for replenishing personal call minutes. Communication services manager 174 may transmit data to telematics unit 120 in mobile vehicle 110 through wireless carrier system 140, communication network 150, land network 160, voice and data switch 172, and networks 180. Communication services manager 174 may store or retrieve data and information from communication services database 176. Communication services manager 174 may provide requested information to communication services advisor 178.

Communication services advisor 178 may be a virtual advisor. A virtual advisor may be a synthesized voice interface responding to requests from telematics unit 120 in mobile vehicle 110.

Communication services advisor 178 may provide services to telematics unit 120 in mobile vehicle 110. Services provided by communication services advisor 178 comprise enrollment services, navigation assistance, directory assistance, roadside assistance, business or residential assistance, information services assistance, emergency assistance, and communications assistance. Communication services advisor 178 may communicate with telematics unit 120 in mobile vehicle 110 through wireless carrier system 140, communication network 150, and land network 160 using voice transmissions, or through communication services manager 174 and switch 172 using data transmissions. Switch 172 may select between voice transmissions and data transmissions.

FIG. 2 is a flow diagram of one embodiment of a method and system for responding to vehicle requests, in accordance with the current invention. As analog-based systems switch to digital wireless systems various digital communication links become available to the in-vehicle communication device inside the telematics unit, as described above. The term digital may be understood to describe any format of data communication that is not analog. The method and system of responding to vehicle requests 200 emphasizes a method and system for responding to digital vehicle requests by transmitting voice data over a digital connection.

The method begins at block 205. The telematics unit 120 is activated at block 210 by a user in the mobile vehicle or by a remote node. A digital connection is then established at block 215 between the mobile vehicle 110 and the call center 170 over a digital wireless carrier system 140. Information may be delivered through a packet data connection on the established digital channel. The telematics unit 120 embedded in the mobile vehicle 110 then receives an initiation sequence, at block 220, to activate the virtual advisor application. This may be done by pressing a speech recognition activation button on the speech recognition system, or the car's ignition being turned to the on position. In one embodiment, the user presses the "voice" button to activate the system. In another embodiment, the speech recognition system turns on when the user starts the vehicle. In yet another embodiment, the speech recognition system turns on when a communication from a remote node is initiated.

The user inputs, at block 225, a voice request through the microphone 130, which is then passed to the DSP 122. The input received by the microphone 130 and passed to the DSP 122 may comprise line level audio. The DSP 122 contains at least one analog digital converter, which can perform conversions from analog to digital formats and vice versa, as described above.

The input received from the microphone 130 is readied for transmission at block 230. The audio stream data may be filtered to eliminate extraneous background or other noises so that only relevant data is sent to the call center 170. The analog data is then digitized and compressed at the DSP 122. As described above, the DSP 122 contains computer programs and converters that are responsible for encoding, digitizing, and compressing the analog data for transmission. These converters and programs may be optimized for encoding, digitizing, and compressing the analog data for a computer end-recipient. The converters and programs do not need to facilitate a later decoding into line level audio due to the digital input of the computer end-recipient. The computer programs and converters can use a very high compression algorithm, as the data does not need to be recognizable by a human recipient. The compression algorithm may compress the audio data at 2 to 3 times the compression ratio of human recognizable audio data compression. A very high data compression ratio can thus be achieved. In one embodiment, the data is compressed at a 20 to 1 compression ratio. In another embodiment, the data is compressed at a 36 to 1 compression ratio. In yet another embodiment, the data is compressed between a 20 to 1 and a 36 to 1 compression ratio.

The readied digital audio data can then be further prepared for transmission and sent via the digital wireless carrier system 140 at block 235. The encoded data stream is segmented and split into data packets to facilitate transmission. The packetized data is then transmitted to the digital wireless carrier 140. The data can be transmitted using established data protocols. In one embodiment, the data is transmitted via a digital cellular 3G packet data protocol. The packetized data is not converted to an analog signal for transmission via the digital wireless carrier 140.

The data is forwarded to the call center 170 at block 240. The data is forwarded from the wireless carrier system 140 to the communication network 150. The data is further relayed to the land network 160 via an established protocol. In one embodiment, the data is relayed via an Internet protocol. The relayed data is not converted to an analog signal and remains a digital signal. The call center 170 then receives the digital packetized data.

At the call center 170, the packetized data is parsed, at block 245, to determine the user request. The parsed data is then transformed into computer commands by a computer decoder. Since the data is digital and optimized for a computer recipient, this data is transformed directly into commands for a virtual advisor 178. The virtual advisor 178 processes the transformed commands and generates a response to the request at block 250. The virtual advisor 178 may access an information database. The generated response is digital, and may be directly encoded and compressed for a human end-recipient.

The generated transformed response is then transmitted at block 255 to the land network 160. The response may be transmitted in any number of accepted formats. In one embodiment the transformed response is transmitted in a digital streaming audio format. The response is relayed from the land network 160 to the communication network 150. The response is further relayed to the wireless carrier system 140 and is then transmitted to the mobile vehicle 110. The response audio stream remains in a digital format throughout the transmission of block 255.

In the mobile vehicle 110, the response audio stream is passed to the DSP 122 where it is decoded and converted into an analog output at block 260. The transformation from digital to analog output may be accomplished by a digital to analog converter as described above. The decoded analog audio stream may then be passed to one or more speakers 132 to be played for human listening. Note that the signal digitally encoded at block 230 has remained digital through the method until block 260.

The transmission of data from the mobile vehicle 110 to the virtual advisor 178 and from the virtual advisor 178 to the mobile vehicle is asymmetrical. Transmission of data from mobile vehicle 110 is highly compressed and encoded, as the end-recipient is a computer application. The transmission of data from the virtual advisor 178 to the mobile vehicle is compressed to allow the user of the mobile vehicle 110 to understand the response. The method and system for responding to a vehicle request may be designed and optimized for a minimum vehicle user impact.

Method 200 ends at block 270.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for responding to digital vehicle requests, the method comprising:
   receiving a voice query at a telematics unit in a vehicle;
   converting the voice query to a digital signal;
   transmitting the digital signal from the telematics unit to a computer-end recipient at a call center node in communication with an information database, wherein the digital signal is sent to the computer-end recipient at the call center node via a digital packet data protocol over a wireless network;
   extracting a computer-readable command from the digital signal;
   executing the extracted computer-readable command at the call center node;
   accessing the information database based on the computer-readable command;
   formulating at least one response to the computer-readable command using the computer-end recipient;
   transmitting the at least one formulated response via the digital packet data protocol over the wireless network to the telematics unit, wherein the digital signal transmitted to the computer-end recipient and the formulated response are each compressed at different compression ratios based on whether the digital signal or formulated response is audibly played in a vehicle, and wherein when the at least one formulated response is to be audibly played in the vehicle the digital signal is compressed using a compression ratio that is at least twice the compression ratio used to compress the at least one formulated response; and
   translating the at least one formulated response to an analog format for playback in the vehicle.

2. The method of claim 1 further comprising:
   optimizing the telematics unit for transmission of the voice query to a computer call center node.

3. The method of claim 2 further comprising:
   filtering the received voice query before converting it to the digital signal.

4. The method of claim 1 further comprising:
   transmitting the signal to the call center using a cellular packet data connection.

5. The method of claim 1 wherein transmitting the at least one formulated response via the digital packet data protocol over the wireless network to the telematics unit comprises:
   transmitting the at least one formulated response in a digital streaming audio format.

6. The method of claim 1 wherein transmitting information via the wireless network further comprises transmitting information via an Internet protocol.

7. A method for responding to digital vehicle requests, comprising the steps of:
   receiving a voice query at a telematics unit in a vehicle;
   converting the voice query to a digital signal;
   compressing the digital signal at a particular compression ratio that is established for transmitting voice queries that are not audibly reproduced;
   transmitting the digital signal from the telematics unit to a remote computer-end recipient via a digital cellular packet data protocol;
   parsing the digital signal using the computer-end recipient to determine an inquiry;
   formulating at least one response to the inquiry;
   compressing the at least one response at a compression ratio that is established for audible playback in the vehicle, which is two or more times less than the particular compression ratio;
   receiving a transmission of the at least one formulated response at the telematics unit via the digital cellular packet data protocol; and
   presenting the at least one formulated response.

8. The method of claim 7, wherein the digital cellular packet data protocol is the digital cellular 3G packet data protocol.

9. The method of claim 7, wherein the step of transmitting the digital signal to a remote computer-end recipient via a digital cellular packet data protocol, further comprises transmitting the digital signal via a digital streaming audio format.

10. The method of claim 7, wherein the digital signal is compressed with a compression ratio at least twice the compression ratio used to compress the at least one response.

11. The method of claim 7, wherein the parsing step and formulating step are automated by the computer-end recipient.

12. The method of claim 7, wherein the presenting step further comprises converting the at least one formulated response to an analog signal and playing the signal as audio through at least one speaker in the vehicle.

* * * * *